United States Patent [19]
Paulson et al.

[11] Patent Number: 6,114,430
[45] Date of Patent: Sep. 5, 2000

[54] AQUEOUS PAINT COMPOSITIONS COMPRISING POLYETHER AMIDES

[75] Inventors: Virginia A. Paulson, Roseville; Keith W. Wiitala, Woodbury; Michael J. Dochniak, White Bear Lake, all of Minn.

[73] Assignee: H.B. Fuller Licensing & Financing, Inc., St. Paul, Minn.

[21] Appl. No.: 09/382,813

[22] Filed: Aug. 25, 1999

[51] Int. Cl.⁷ .............................. C08K 3/34; C08L 77/12
[52] U.S. Cl. ...................... 524/432; 524/444; 524/449; 524/451; 524/492; 524/493; 524/514; 427/136; 427/427; 427/428
[58] Field of Search ...................... 524/514, 413, 524/451, 449, 432, 444, 492, 493; 427/136, 372.2, 427, 428

[56] References Cited

U.S. PATENT DOCUMENTS 4,946,932   8/1990   Jenkins .......................... 528/272

OTHER PUBLICATIONS

Derwent–Acc No. 1991–205372:RD 326020A, Jun. 10, 1991.

*Primary Examiner*—Ana Woodward
*Attorney, Agent, or Firm*—Nancy N. Quan

[57] ABSTRACT

The present invention discloses aqueous paint compositions having enhanced adhesion characteristics. The compositions contain at least one water-soluble and/or water-dispersible polyether amide comprising the reaction product of polyoxyalkylene diamines and polycarboxylic acids. The dried compositions have improved adhesion characteristics making them particularly useful protective and/or decorative coatings on substrates including wood, metal, concrete, and plastic.

20 Claims, No Drawings

AQUEOUS PAINT COMPOSITIONS COMPRISING POLYETHER AMIDES

FIELD OF THE INVENTION

The invention relates to aqueous paint compositions having enhanced adhesion characteristics. Specifically, it relates to aqueous paint compositions comprising at least one polyether amide. More specifically, it relates to aqueous paint compositions having enhanced dry and wet adhesion characteristics making them particularly useful as protective and/or decorative coatings.

DESCRIPTION OF THE PRIOR ART

It is recognized that oil-based paints form protective and/or decorative coatings having effective wet and dry adhesion characteristics. In comparison, aqueous paints that have been designed to be more environmentally friendly often lose some of their adhesion characteristics when exposed to very dry, moist, or humid conditions. The paint industry has, to some degree, overcome this adhesion problem by incorporating specialty monomers into the paint binders. For example, ethylenically unsaturated cyclic ureas have been copolymerized into acrylic dispersions to form binders which improve the wet and dry adhesion characteristics of paints. These are described in the following patents: U.S. Pat. No. 5,496,907 (Dochniak); U.S. Pat. No. 4,783,539 (Abboud et al.); U.S. Pat. No. 4,632,957 (Welsh et al.); U.S. Pat. No. 4,487,941 (Sekmakas et al.); U.S. Pat. No. 4,319,032 (Sandri et al.); and U.S. Pat. No. 4,314,067 (Herman et al.).

Although such specialty monomers have been shown to be effective adhesion promoters, their synthesis, purification, and incorporation into the paint binders is labor intensive and costly. Thus, there remains a need for adhesion promoters that can be easily produced and simply blended into aqueous paint compositions.

The present inventors have discovered that water-soluble and/or water dispersible polyether amides can be easily blended into aqueous paints to form protective and/or decorative coatings having enhanced adhesion characteristics when dried. Several patents directed to the synthesis of polyether amides, and their use, are described below:

U.S. Pat. No. 3,882,090 (Fagerburg et al.) disclose linear water-soluble polyamides useful as adhesives, textile sizing agents, and coatings. For example, the polyamides have utility as hot-melt adhesives and as water-soluble films used for packaging detergents, dry bleach, and such products. Various additives may also be incorporated into the sizing composition to achieve specific results. Examples of such additives include titanium dioxide, dyes, other pigments, and stabilizers such as antioxidants.

U.S. Pat. No. 5,324,812 (Speranza et al.) disclose water-soluble polyamides from polyalkylene glycol diamines and polycarboxylic acids. The water soluble polymers find use as hot-melt adhesives, lubricants, mold release agents, disposable items (e.g., plastic containers, medical disposables, cosmetic containers, etc.), water thickeners, encapsulates for insecticides, fertilizers, detergents, ink carriers or as temporary protective coatings.

U.S. Pat. No. 5,663,286 (Ahmed et al.) disclose non-woven web comprising water soluble polyamides and articles therefrom. Such water soluble webs have utility in the manufacture of disposable absorbent articles such as disposable diapers, feminine napkins, incontinence products and cellulosic articles such as tissues and towels, as well as for water soluble heat-fusible webs for the textile industry.

U.S. Pat. No. 5,837,802 (Van Lith et al.) disclose a fast-setting, water-sensitive polyamide composition which is a dicarboxylic acid ester or anhydride and at least one reactant is a diamine wherein at least one of said diamines is polyoxyalkylene diamine and at least one of said other reactants is aromatic and said polyamide composition has a Tg of greater than about 15° C. and a Δ H greater than 0 Joules/gram. These compositions are useful as adhesives, coatings, films and as nonwoven web materials, and may be used in any application where remoistenability or water sensitivity is required. Some applications include adhesives and coatings for envelopes, stamps, packaging tapes, stickers, and labels. The compositions are also useful for construction and seating of packaging materials such as cases, cartons, and bags where recycling of the containers is desired. The compositions find particular utility in the non-woven industry and for bookbinding applications, for manufacturing cigarettes, for roll wrapping, core winding and tissue plybonding.

Although the references above describe polyether amides as remoistenable adhesives and coatings, they do not teach or suggest polyether amides as adhesion promoters for aqueous paint compositions.

SUMMARY OF THE PRESENT INVENTION

One aspect of the present invention is to extend the variety and compass of additives useful for improving the properties of aqueous paint compositions. The applicants have now discovered that when water soluble and/or dispersible polyether amides are formulated into aqueous paint compositions, the dried coatings show enhanced dry and wet adhesion characteristics.

Another aspect of the present invention relates to an aqueous paint composition comprising:
 a) at least one aqueous polymer dispersion comprising the reaction product of at least one ethylenically-unsaturated monomer;
 b) at least one inorganic pigment; and
 c) at least one polyether amide comprising the condensation product of
  i) at least one polycarboxylic acid; and
  ii) at least one polyoxyalkylene diamine.

Still another aspect of the invention relates to an aqueous paint composition comprising:
 a) at least one aqueous polymer dispersion comprising the reaction product of at least one ethylenically-unsaturated monomer,
 b) at least one inorganic pigment; and
 c) at least one polyether amide comprising the condensation product of,
  i) at least one polycarboxylic acid; and
  ii) at least one polyoxyalkylene diamine;
 wherein said amide is present in a range of from about 1.0% by weight to about 10.0% by weight based on total solids.

Surprisingly, the dried aqueous paint compositions described above have enhanced wet and dry peel strength when applied to alkyd resin-coated panels.

The aqueous paint compositions of the present invention are useful protective and decorative coatings for substrates which include paper, wood, leather, metal, ceramics, asphalt, concrete, cloth, natural rubber, and synthetic polymers such as plastic.

Additionally, the compositions may be applied to any substrate using known application methods including brushing, spraying, and roll coating.

In another aspect, the present invention discloses a method for the preparation of an aqueous paint composition comprising the steps of 1) providing at least one aqueous polymer dispersion comprising the reaction product of at least one ethylenically-unsaturated monomer;
2) providing at least one inorganic pigment,
3) providing at least one polyether amide comprising the condensation product of
   a) at least one polyoxyalkylene diamine, and
   b) at least one polycarboxylic acid; then
4) blending 1), 2), and 3) to form said composition.

Another aspect of the invention relates to a method of enhancing the adhesion of aqueous paint composition, comprising the steps of:

1) providing at least one aqueous polymer dispersion comprising the reaction product of at least one ethylenically-unsaturated monomer;
2) providing at least one inorganic pigment;
3) adding an effective amount of at least one polyether amide to a blend of (1) and (2) to enhance adhesion of the aqueous paint composition, said polyether amide comprising the condensation product of:
   a) at least one polyoxyalkylene diamine, and
   b) at least one polycarboxylic acid.

Other aspects, objects, features and advantages of the present invention would be apparent to one of ordinary skill in the art from the following detailed description illustrating the preferred embodiments of the invention.

DETAILED DESCRIPTION OF THE INVENTION

The following glossary is provided as an aid to understand the use of certain terms herein. The explanation provided in the glossary are for illustrative purposes and do not limit the scope of the invention.

The term "condensation" described herein is defined as a polymer formed from a chemical reaction in which monomeric or polymeric subunits are joined through intermolecular elimination of small molecules such as water or alcohol.

The term "water soluble" described herein is defined as a polymer that forms a homogeneous mixture or solution when combined with water.

The term "effective amount" is an amount sufficient to obtain the desired result, i.e., enhance or promote adhesion.

The term "ethylenically-unsaturated monomer" described herein is defined as any compound containing $\alpha$, $\beta$-unsaturated carbonyl groups, vinyl groups, allylic groups, acrylamide groups, or their mixtures.

The terms "dispersible" or "dispersion" or "dispersed" described herein is defined as a polymer suspended in an aqueous medium.

The term "aqueous polymer dispersion" described herein is defined as a dispersed polymer comprising the reaction product of at least one radically-polymerized ethylenically-unsaturated monomer.

The term "polyether amide" described herein is defined as a polymer containing more than two amide groups and is also intended to include polyether amides containing urea groups.

The aqueous paint compositions of the present invention comprise:

a) at least one aqueous polymer dispersion comprising the reaction product of at least one ethylenically-unsaturated monomer;
b) at least one inorganic pigment; and
c) at least one polyether amide comprising the condensation product of,
   i) at least one polycarboxylic acid; and
   ii) at least one polyoxyalkylene diamine.

The aqueous polymer dispersions may be prepared using known "emulsion polymerization" techniques. For example, a "one-shot" process may be used wherein a mixture of materials comprising ethylenically unsaturated monomers, water, surfactant, and a free-radical initiator is heated. The initiators decompose to form free radicals that initiate chain propagation. Alternatively, a semi-continuous batch process may be employed to produce the aqueous polymer dispersions. In this process, the initial particles are formed from a batch charge of monomer, catalyst, and surfactant. The remaining monomer is continuously added to the reaction vessel during the course of the polymerization. If desired, monomer may be power fed into the reactor by beginning the feed of the first monomers into the reactor while simultaneously feeding a second monomer into the tank that holds the first monomer. The resulting polymer has a composition that ranges from that derived of the initial makeup of the first monomer and varies up to the composition which is derived from the mixture that is present in the first monomer tank near the end of the total feed. The power feed method of emulsion polymerization is further described in American Chemical Society (ASC) Symposium Series, 165 (Emulsion Polymer.), pp. 389–403. Other ingredients such as catalysts, surfactants, stabilizers and buffers may be added anytime during the emulsion polymerization process. Additionally, the polyether amides described in the present invention may also be added to the aqueous polymer dispersion before, during, or after the emulsion polymerization process.

If desired, a water-soluble polymer referred to as a "protective colloid" may be used during the emulsion polymerization process. A water-soluble polymer can be dissolved in the water phase prior to polymerization. The "protective colloid" often contributes to the stability and rheology of the resulting dispersion. Polyether amides described in the present invention may be particularly useful as protective colloids for the preparation of the aqueous polymer dispersions. The polyether amide may be amine terminated and/or acid-terminated and can have a number average molecular weight in a range of from about 10,000 grams per mole to about 350,000 grams per mole, and preferably from about 30,000 grams per mole to about 250,000 grams per mole. Such protective colloids can be present, in the final dispersion, in a range of from about 0.1% by weight to about 20% by weight, and preferably from about 0.5% by weight to about 5% by weight based on total solids. It is assumed grafting reactions may take place during the emulsion polymerization process. The graft polymerization process is further described in "Polyvinyl Alcohol Developments", edited by C. A. Finch, John Wiley & Sons, New York, 1992, pp. 449–453.

The aqueous polymer dispersions, used in the present invention, are formed by free-radical polymerization of at least one ethylenically unsaturated monomer in an aqueous medium. The polymerization is usually conducted at a temperature in a range of from about 5° C. to about 85° C., and preferably from about 25° C. to about 80° C. These dispersions are preferably used as the binder in the aqueous paint composition of the present invention. Suitable examples of ethylenically-unsaturated monomers include allyl alcohol, allyl glycidyl ether, allyl acrylate, allyl methacrylate, acrylonitrile, acrylarnide, methyl or higher alkyl acrylates, or methacrylates, maleic anhydride, or maleic esters, styrene or substituted styrene, vinyl alcohol, vinyl acetate, vinyl chloroacetate, vinyl chloride, vinylidene dichloride, vinyl bromide, vinyl methyl ether, vinyl propyl ether, vinyl butyl ether, vinyl benzoate, vinyl laureate, vinyl methoxyethyl ether, vinyl benzyl ether, vinyl sulfonic acid, vinyl pyrolidone, vinyl pyridine, methacrylonitrile, methacrylamide, ethylene and higher olefins. Difunctional or higher functionality monomers may be included, for example, ethylene glycol dimethacrylates, poly(ethylene oxide)dimethacrylate or divinyl benzene. Other useful monomers are described in U.S. Pat. No. 3,804,881 (Bassett et al.) incorporated herein by reference.

Specialty monomers may also be incorporated into the aqueous polymer dispersions and include: the amino organosilane coupling agents described in U.S. Pat. No. 4,745,028 (PPG) and U.S. Pat. No. 5,236,982 (Owens Corning); the imidazolidinone functional wet adhesion monomers described in U.S. Pat. No. 5,496,907 (H. B. Fuller); and the Vinamer™ EF monomer which is N-ethyl formamide from Air Products & Chemicals, Inc., (Allentown, Pa.). These materials may be used to further enhance the adhesion characteristics of the aqueous paint compositions of the present invention.

The aqueous polymer dispersions used in the present invention are preferably anionic having a pH ranging from about 4 to about 12, and preferably from about 6 to about 9. The anionic groups may be made ionic using counter-cations (bases) such as alkali metal hydroxides, tertiary amines, and ammonia. The preferred bases are potassium hydroxide, sodium hydroxide, triethylamine, and ammonia. In the preparation of aqueous polymer dispersions having increased water resistance and reduced volatile organic chemicals (VOC), ammonia is most preferred.

The dispersions may have any suitable number average molecular weight distribution provided that it is sufficiently high to permit a distinct particle phase. Preferably, the number average molecular weight distribution is greater than about 10,000 grams per mole, and most preferably greater than about 50,000 grams per mole. The dried aqueous polymer dispersions may have single glass transition temperature (Tg) or multiple Tgs in a range of from about −75° C. to about +150° C., preferably from about −50° C. to about +100° C. A Tg of less than about −75° C. may be undesirable for protective coatings in that such polymers are often tacky and tend to soften when subjected to heat. Alternatively, a Tg of greater than about +150° C. maybe undesirable for protective coatings in that such polymers are often brittle and tend to crack when subjected to cold conditions.

The aqueous polymer dispersions may have a solids content in a range of from about 20% by weight to about 80% by weight, preferably from about 30% by weight to about 70% by weight, and most preferably from about 45% by weight to 60% by weight, based on total solids. A solids content of less than about 20% by weight may be undesirable in that aqueous paint compositions having increased water are more difficult to thicken and generally have increased dry times. Alternatively, an aqueous polymer dispersion having a solids content of greater than about 70% by weight often form viscous materials, making them difficult to handle. The dispersions may be monomodal or bimodal and generally have a mean particle size distribution in a range of from about 0.05 microns to about 10 microns, and preferably less than about 2 microns.

Furthermore, the dispersions may also include any of the ingredients commonly used in emulsion polymerization processes including emulsifiers and surfactants (nonionic and anionic). Other water-soluble polymers may be included for example those commonly referred to as "protective colloids" such as hydroxyl ethyl cellulose, poly(vinyl acetate/vinyl alcohol), poly(vinyl pyrrolidone), poly (acrylamide) and sodium carboxy methyl cellulose. Transfer agents such as thioglycolic acid, primary octyl mercaptan, and other mercaptans may be included to lower and control the molecular weight distribution. The dispersions may also comprise materials including defoamers, coalescing aids, fungicides, bactericides, plasticizers (paraffinics, naphthenics, phthalates), thickening agents, freeze-thaw additives, UV stabilizers, odorants, organic cosolvents, water-dispersible waxes, water-dispersed oils, fire-retardant agents, and mixtures thereof The aqueous polymer dispersion is present in the aqueous paint composition in a range of from about 5% by weight to about 35% by weight, preferably from about 10% by weight to about 25% by weight, based on total solids. An aqueous polymer dispersion content of greater than about 35% by weight may be undesirable in that such paints often have lower viscosities and reduced splatter resistance. Alternatively, an aqueous polymer dispersion content of less than about 5% by weight may be undesirable in that such paints often have reduced adhesion characteristics and gloss.

The polyether amides used in the present invention are often formed using a method wherein at least one polyoxyalkylene diamine is blended with at least one polycarboxylic acid to form a salt mixture. The mixture is then heated, preferably in an oxygen-free environment of nitrogen or argon, to a temperature in a range of from about 130° C. to about 300° C. The polycarboxylic acid and polyamine condense, releasing water as a by-product, to generate the polyether amide. Such methods are taught in the above-identified U.S. Pat. No. 5,324,812 (Speranza et al.), U.S. Pat. No. 3,882,090 (Fagerberg et al.), U.S. Pat. No. 5,663,286 (Ahmed et al.), and U.S. Pat. No. 5,837,802 (Van Lith et al.).

Suitable polyoxyalkylene diamines include ethoxylated diamines, propoxylated diamines, ethoxylated/propoxylated diamines, and their mixtures. Preferred polyoxyalkylene diamines, which can be used to form water-soluble polyether amides, have the general formula:

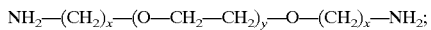

$$NH_2-(CH_2)_x-(O-CH_2-CH_2)_y-O-(CH_2)_x-NH_2;$$

wherein x ranges from 2 to 3 and y ranges from 1 to 2.

Additionally, higher molecular weight polyoxyalkylene diamines often form polyether amides having increased water solubility. Suitable examples of polyoxyalkylene diamines based on a predominately polyethylene oxide backbone include Jeffamine® EDR-148, Jeffamine® EDR-192, Jeffamine® ED-600, Jeffamine® ED-900, and Jeffamine® ED-2000. Amine terminated polyoxypropylene diamines include Jeffamine® D-230, Jeffamine® D-400, Jeffamine® D-600, and Jeffamine® D-2000, all commercially available from Huntsman Chemical Company (Houston, Tex.). Other useful commercially available polyoxyalkylene diamines include: 4,7-dioxadecane-1,10 diamine; 4,9-dioxadodecane-a, 12-diamine; and 4,7,10, trioxatridecane- 1,13-diarnine from BASF Corporation (Parsippany, N.J.). Another useful class of diamines includes the aminopropyl polyoxyethylene compounds of the general formula:

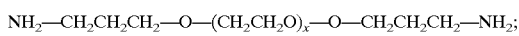

$$NH_2-CH_2CH_2CH_2-O-(CH_2CH_2O)_x-O-CH_2CH_2CH_2-NH_2;$$

wherein x ranges from about 10 to about 50.

These products may be prepared by the addition of acrylonitrile to polyethylene glycol, followed by hydrogenation of the nitrile to an amine. If desired, small quantities of amines that are free of ether linkages may be used to form the polyether amides used in the present invention. Such materials are less preferred in that the polyether amides formed may have fewer ether groups resulting in decreased water sensitivity. Suitable examples include imidazolidinone diamines, hexamethylene diamine, isophorone diamine, and piperazine.

If desired, polyoxyalkylene monoamines or ether-based monoamines may be used to terminate the polyether amides. Such materials condense with the polycarboxylic acids and reduce the polyamides number average molecular weight distribution. Lower molecular weight polyether amides may be useful in that such polymers often have reduced melt temperatures and increased water solubility. Suitable examples of polyalkylene monoamines include Jeffamine® M-600, Jeffamine® M-I 000, Jeffamine® M-2005, and Jeffamine® M- 2070, all commercially available from Huntsman Chemical Corporation (Houston, Tex.). These products are prepared by the addition reaction of a monohydric alcohol initiator with ethylene and/or propylene oxide, followed by conversion of the terminal alkoxy group to an amine. Other useful commercially available ether-based monoamines include 2-methoxyethylamine and 3-methoxypropylamine from BASF Corporation (Parsippany, N.J.). The amines described above may be present during the polyether amide condensation reaction in a range of from about 0.1% by weight to about 10.0% by weight, based on the total weight of the polyether amide. A monoamine content greater than about 10.0% by weight can be detrimental to the polyether amides physical properties in that a lower number average molecular weight distribution often form polyether amides having reduced tensile strength, making them less effective binders.

If desired, small amounts of polypropoxylated triamines (ether triamine) may be used to make the polyether amides. Such materials condense with the polycarboxylic acid to form a crosslinked polymer network. Suitable examples include Jeffamine®T403, Jeffamine® T-3000, and Jeffamine® T-5000, all commercially available from Huntsman Chemical Corporation (Houston, Tex.). The Jeffamine®T series products are propylene oxide based triamines and are prepared by the addition reaction of propylene oxide with a triol, followed by amination of the terminal propoxy groups. Of course, other polyamines that are free of ether linkages may be used to form the crosslinked polyether amides. A suitable example is diethylenetriamine. The triamines described above may be present during the condensation reaction in a range of from about 0.1% by weight to about 10.0% by weight, based on the total weight of the resulting polyether amide. A triamine content greater than about 10.0% by weight can be detrimental to the polyether amides physical properties in that increased crosslink density often form polyether amides having reduced water solubility and/or water dispersibility, making them less compatible with the aqueous paint compositions.

Preferably, dicarboxylic acids are used to make the polyether amides. These acids condense with primary and/or secondary amines to form substantially linear polyether amides. Suitable examples of dicarboxylic acid, or their esters, include succinic acid, adipic acid, diethyl adipate, pimelic acid, azelaic acid, sebacic acid, dodecanoic acid, terephthalic acid, isophthalic acid, t-butyl isophthatic acid and their mixtures, Additionally, if desired, dicarboxylic acids having ether linkages may also be used to form polyether amides. The dicarboxylic acids can be present during the condensation reaction using an equivalence ratio of carboxylic acid to amine in a range of from about 1.3/0.7 to about 0.7/1.3, and preferably from about 1.1/0.9 to about 0.9/1.1. A ratio greater than about 1.0 will form acid-terminated polyether amides. Alternatively, a molar ratio less than about 1.0 will form amine-terminated polyether amides.

If desired, polycarboxylic acids having three or more carboxylic acid moieties per molecule may be used. Such materials condense with the polyalkylene diamines to form a crosslinked polymer network. Suitable examples include trimetallic acid and pyrometallic acid. Such polycarboxylic acids may be present during the condensation reaction in a range of from about 0.1% by weight to about 3.0% by weight, based on the total weight of the polyether amide. A polycarboxylic acid content greater than about 3.0% may be detrimental to the polyether amides physical properties in that polyether amides having high crosslinked density are difficult to process due to increased viscosity. Additionally, highly crosslinked polyamides often have reduced water sensitivity making them less compatible with the aqueous paint compositions.

If desired, a urea moiety may be introduced into the polyether amide. For example, the polyoxyalkylene amine may be reacted with a small quantity of isocyanate. The polyisocyanate may be a linear aliphatic isocyanate, a cyclic aliphatic isocyanate, an aromatic isocyanate, or their mixtures. Useful isocyanates include cyclohexyl isocyanate, hexamethylene diisocyanate, and the isocyanurate of hexamethylene diisocyanate. Other useful isocyanates are described in U.S. Pat. No. 5,523,344 (Maksymkiw et al.). Aliphatic diisocyanates are most preferred in that such materials are chain extenders and often have increased UV resistance when compared to aromatic polyisocyanates.

To enhance the polyamides water solubility, it may be desirable to form their corresponding salts. For example, amine-terminated polyether amides can be made ionic using organic and/or inorganic acids. Suitable examples include formic acid, acetic acid, propionic acid, hydrochloric acid, salicylic acid, and their mixtures. A preferred organic acid is glacial acetic acid. Alternatively, acid-terminated polyether amides can be made ionic using organic or inorganic bases that include alkali metal hydroxides, tertiary amines, and ammonia. Preferred organic bases are sodium hydroxide, triethylamine, ammonia, and mixtures thereof The organic amine organic bases are most preferred in that such materials often volatilize, as the aqueous paint composition dries, improving the coatings water resistance properties. Furthermore, mixtures of acid-terminated polyether arnides and amine-terminated polyether amides may be used to enhance water solubility.

The polyether amides used in the present invention may contain ester linkages. Esters are introduced into the polyether amide backbone by condensing polyalcohols with polycarboxylic acids. Suitable polyalcohols include polymeric polyols and polyols having a molecular weight less than about 500 grams per mole. Examples of polymeric polyols include polyether polyols, polyester polyols, polyether-ester polyols, polylactone polyols, polycarbonate polyols, polyacrylic polyols, polycaprolactone polyols, and sulfonated polyols. Examples of polyols having a molecular weight less than about 500 grams per mole include ethanediol, the various propane-, butane- and hexanediols, dimethylolcyclohexane, 2,2-bis(4-hydrocyclohexyl) propane, diethylene glycol, triethylene glycol, tetraethylene glycol, glycerol, trimethylolethane, or trimethylolpropane, hexanetriol, neopentyl glycol, pentaerythrithol, dipentaerythrithol or sorbitol. Polyether amides having ester linkages are often less preferred in that such polymers are susceptible to hydrolysis.

The polyether amides described above may be introduced into the aqueous paint composition using several different methods. For example, a polyether amide having a water content of less than about 1% by weight may be blended into an existing aqueous paint composition using mechanical agitation. Alternatively, a polyether amide having a water content greater than about 20% by weight may be blended into an existing paint.

The water-based polyether amide may have a solids content in a range of from about 10% by weight to about 90% by weight, preferably from about 20% by weight to about 80% by weight, and most preferably from about 30% by weight to about 60% by weight based on total solids. The water-based polyether amide may have a viscosity, at ambient room temperature, less than about 200,000 centipoise, preferably less than about 100,000 centipoise, and most preferably less than about 50,000 centipoise. A viscosity greater than about 200,000 centipoise is less preferred in that such materials often have poor flow characteristics making them difficult to handle. In the most preferred method, a water-based polyether amide having a water content greater than about 40% by weight and a viscosity of less than about 50,000 centipoise is simply blended into an existing paint formulation.

The polyether amide is present in the aqueous paint compositions in a range of from about 1% by weight to about 17% by weight, preferably from about 3.0% by weight to about 10% by weight, and most preferably from about 3.0% by weight to about 5.0% by weight, based on total solids. A polyether amide content greater than about 15% can be detrimental to the dried coatings water resistance properties. Alternatively, a polyether amide content less than about 1% may be ineffective in that such quantities may not adequately bind the paint to enhance adhesion.

At least one inorganic pigment is used to make the aqueous paint compositions of the present invention. Suitable examples include titanium dioxide, talc, mica, silicates, zinc oxide clay, iron oxide, and mixtures thereof. Titanium dioxide is a preferred pigment.

The pigments are present in a range from about 15% by weight to about 45% by weight, preferably from about 25% by weight to about 35% by weight based on total solids. A pigment content greater than about 45% by weight may be undesirable in that such paints often have reduced adhesion characteristics, increased viscosity making them difficult to apply, and chalk when dried. Alternatively, a pigment content less than about 15% by weight may be undesirable in that such paints may have reduced wet adhesion and often have reduced hiding characteristics making them less effective as protective and decorative coatings.

The aqueous paint compositions can be formed using a method comprising the steps of
1) providing at least one aqueous polymer dispersion comprising the reaction product of at least one ethylenically-unsaturated monomer;
2) providing at least one inorganic pigment;
3) providing at least one polyether amide comprising the condensation product of:
 i) at least one polyoxyalkylene diamine; and
 ii) at least one polycarboxylic acid; then
4) blending 1), 2), and 3) to form said composition.

Preferably, the aqueous paint compositions are formed using a pigment grind comprising titanium dioxide. Other useful materials include Marble White 199 (calcium carbonate) available from Filler Products Inc. (Chatsworth, Ga.), Kaolin (hydrated aluminum silicate or china clay), barium sulfate, carbon black, iron oxide, silicate spheres, reprocessed rubber, water-soluble materials such as the polyether amides described herein, substituted cellulose, methacrylic acid or acrylic acid copolymers, wetting agents, and dispersing agents. The pigment grind can be prepared using any of the several techniques known to those skilled in the art. These techniques involve a dispersing or grinding process that separates the particles of the particulate materials in the presence of dispersing agents to give a fluid, stable dispersion. The aqueous paint compositions may be further modified by the addition of materials including defoamers, coalescing aids, coloring agents (dyes), fungicides, bactericides, plasticizers (paraffinics, naphthenics, phthalates), thickening agents, freeze-thaw additives, UV stabilizers, odorants, organic cosolvents, water dispersible waxes, water dispersed oils, fire retardant agents, and mixtures The aqueous paint compositions may be formulated into primer, flat, semi-gloss or gloss paints. The paints can be designed for indoor and outdoor use. For outdoor paint applications, acid-terminated polyether amides are preferably used in the paint compositions in that such polymers are less susceptible to yellowing, making them useful as decorative coatings.

The inventive paint compositions may have viscosities in a range of from about 70 kreb units to about 110 kreb units measured at ambient temperature, preferably from about 90 kreb units to about 100 kreb units. In many paint applications, a viscosity of about 95 kreb units is often preferred in that such materials are less likely to run or sag during the application and drying process. The paints are often dried at ambient conditions, however, special drying equipment such as heaters may be used to accelerate the evaporation of water.

The paints may have a solids content in a range of from about 30% to about 70%, preferably from about 40% to about 60%. A solids content less than about 30% may be undesirable in that higher levels of water and/or solvent increase dry times. Alternatively, a solids content greater than about 70% may be undesirable in that such materials often have increased viscosity making them difficult to apply To further enhance the properties of the paints described in the present invention, including adhesion and cohesion, it may be desirable to formulate the paints with other water-soluble or water-dispersible polymers. Suitable examples include polychloroprenes, polyurethane dispersions, xanthan gum, rosin acid esters, starches, dextrins, caseins, animal pectins, and mixtures thereof These polymers may be present in the aqueous paint compositions in a range of from about 1% by weight to about 30% by weight, and preferably from about 5% by weight to about 10% by weight, based on total solids. Such polymers may be introduced during any stage of the production process.

If desired, the aqueous paint compositions may be formulated with at least one water dispersible polyfunctional crosslinking agent selected from the group consisting of polyisocyanates, polyaziridines, melamine-formaldehyde resins, polyepoxies, polycarbodiimides, and mixtures thereof. The crosslinking agents are preferably added to the paint composition, prior to their application. Such materials react to form a protective coating having enhanced properties including water resistance, solvent resistance, heat resistance, scratch resistance and abrasion resistance. The crosslinking agent may be present in the paint formulation in a range of from about 1% by weight to about 20% by weight, and preferably from about 3% by weight to about 7% by weight based on total solids.

The aqueous paint compositions described above can be applied onto any surface or substrate including asphalt, concrete, glass, wood, leather, metal, ceramics, cloth, natural rubber, and synthetic polymers such as plastic. Additionally, the paint may be applied using application methods known in the art including brushing, spraying, and roll coating.

The aqueous paint compositions of the invention exhibit markedly enhanced adhesion characteristics compared to similar paints free of polyether amides. It is surmised that the polyether amide interacts with the aqueous polymer dispersion, and inorganic pigment, to form a network that effectively binds the system. Several factors that can influence the polyether amides adhesion promoting characteristics include: the ether equivalence per gram material; the amide equivalence per gram material; the number average molecular weight distribution; water solubility and/or water dispersibility; and the weight percent of polyether amide present in the aqueous paint composition. Several experiments showing the utility of the invention are described below.

All of the cited patents and publications are incorporated herein by reference. The following specific examples are provided to better assist the reader in the various aspects of practicing the present invention. As these specific examples are merely illustrative, nothing in the following descriptions should be construed as limiting the invention in any way.

EXAMPLES

Test Methods

The following test method was used to characterize the aqueous paint compositions of the present invention:
Painted Cheesecloth Adhesion on Alkyd Resin Coated Panels Scope:

This method measures the load, in grams, required to remove painted cheesecloth from an alkyd resin coated panels under dry and wet conditions.
Materials and Equipment:
   Clear cedar siding cut into 15-centimeter×15-centimeter panels;
   Fine and medium grained sandpaper;
   Alkyd gloss enamel;
   Tack cloth;
   Ruler;
   Fine point waterproof marker;
   Paint brush;
   Exterior white paint (primer);
   Cheesecloth cut into 5-centimeter×80-centimeter strips;
   Analytical balance;
   Constant temperature and humidity chamber;
   Constant speed tensile tester e.g., Thwing-Albert Intellect 500.
Procedure:
1. Using the medium-grained sandpaper, remove wood splinters from the cut edges of the clear cedar panel, smooth the surface and finish with the fine-grained sandpaper.
2. Apply exterior white paint (primer) to the backside of the panel and dry completely.
3. Apply at least two coats of alkyd gloss enamel to the front side (unprimed surface) and edges of the panel allowing each coat to dry completely after each application. If necessary, smooth the dried enamel surface with fine-grained sandpaper between coats to form a glossy alkyd coated panel.
4. Place the alkyd-coated panel in a 50° C. oven for 48-hours, then cool to ambient room temperature.
5. Using the waterproof marker and ruler, draw two vertical strips each 5 centimeters in width on the alkyd painted panel leaving a 1.3-centimeter gap between each marked off strip.
6. Place the panel on an analytical balance and apply 1.5 grams of the test paint to one marked off area. Use the control paints on the adjacent marked off area.
   (Note: before painting, wipe off any dust using the tack cloth). Adhere the cheesecloth, which has been folded in half, over the wet painted area leaving about 18-centimeters of cloth above the panel. Apply an additional amount of test paint onto the adhered cheesecloth. Examples of useful coat weights for various test paints are described below:
   Flat paint=5.6 grams;
   Floor paint=5.2 grams;
   Semigloss paint=4.9 grams;
   High gloss paint=4.7 grams.
7. Allow the panel to condition for 10 days in a constant humidity chamber set at 23° C. +/−1.0° C. at 50% +/−5.0% relative humidity.
8. The conditioned panel is then tested for dry adhesion (180° peel) on a constant speed tensile tester, e.g., Thwing-Albert Intellect 500, set at 12-inches peel per minute with a pre-peel of 1-centimeter and a total peel distance of 9-centimeters.
9. To test wet adhesion, submerge half of the cheesecloth painted panel, for 1-hour, in a container of ambient room temperature water (25° C. +/−5.0° C.).
10. Test the soaked panel immediately using the constant speed tensile tester described above.

Example I (A and B)

Example I-A evaluates the dry and wet adhesion characteristics of an aqueous paint composition that is not part of the present invention. The paint composition is described below:

| Compound | Amount (grams) |
| --- | --- |
| Pigment Grind | |
| Water | 66.6 |
| Colloid 226/35 (Rhodia) | 6.2 |
| Nuosept 95 (Huls America) | 1.5 |
| AMP-95 (Angus Chemical) | 1.5 |
| Igepal CO-630 (Rhodia) | 3.5 |
| Tiona RCL-2 (SCM Chemicals) | 250.0 |
| Atomite (ECC America) | 20.0 |
| ASP-1 70 (Englehard Corporation) | 30.0 |
| Drewplus L-464 (Drew Industries) | 1.8 |
| Letdown | |
| Fultex PD-0 1 26 (H.B. Fuller Company) | 400.5 |
| Propylene glycol (Milsolv Corp.) | 47.6 |
| Texanol (Eastman Chemical) | 15.1 |
| Rheolate 278 (Rheox, Inc.) | 7.0 |
| Natrosol 250 MHBR (Aqualon Company) | 2.7 |
| Drewplus L-464 (Drew Industries) | 3.7 |
| Water | 215.2 |
| Troysan Polyphase P-20-T (Troy Chemical Corp.) | 7.0 |

The semigloss paint had a dry adhesion of 1,310 grams and a wet adhesion of 240 grams using the cheesecloth adhesion method described above.

Example I-B evaluates the dry and wet adhesion characteristics of an aqueous paint composition that is part of the present invention.

The semigloss paint used was exactly as described in Example I-A with the exception that 2.5% by weight of NP-2068, a commercially available polyether amide from the H. B. Fuller Company (St. Paul, Minn.), was blended into the paint. The inventive aqueous paint composition had a dry adhesion of 2,320 grams and a wet adhesion of 340 grams.

The data indicates that Example I-B has increased dry and wet adhesion compared to Example I-A, showing the utility of the invention.

Example 2 (A and B)

Example 2-A evaluates the dry and wet adhesion characteristics of an aqueous paint composition that is not part of the present invention. The paint composition is described below:

| Compound | Amount (grams) |
| --- | --- |
| Pigment Grind | |
| Water | 66.6 |
| Colloid 226/35 (Rhodia) | 6.2 |
| Nuosept 95 (Huls America) | 1.5 |
| AMP-95 (Angus Chemical) | 1.5 |
| Igepal CO-630 (Rhodia) | 3.5 |
| Tiona RCL-2 (SCM Chemicals) | 250.0 |
| Atomite (ECC America) | 20.0 |
| ASP-1 70 (Englehard Corporation) | 39.0 |
| Drewplus L-464 (Drew Industries) | 1.8 |
| Letdown | |
| Fultex PD-0126 (H.B. Fuller Company) | 400.5 |
| Propylene glycol (Milsolv Corp.) | 47.6 |
| Texanol (Eastman Chemical) | 15.1 |
| Rheolate 278 (Rheox, Inc.) | 7.0 |
| Natrosol 250 MHBR (Aqualon Company) | 2.7 |
| Drewplus L-464 (Drew Industries) | 3.7 |
| Water | 215.2 |
| Troysan Polyphase P-20-T (Troy Chemical) | 7.0 |

The semigloss paint had a dry adhesion of 770 grams and a wet adhesion of 190 grams using the cheesecloth adhesion method described above.

Example 2-B evaluates the dry and wet adhesion characteristics of an aqueous paint composition that is part of the present invention.

The semigloss paint used was exactly as described in Example I-A with the exception that 5% by weight of NP-2068, which is a commercially available polyether amide from the H. B. Fuller Company (St. Paul, Minn.) was blended into the paint. The inventive aqueous paint composition had a dry adhesion of 4,570 grams and a wet adhesion of 420 grams.

The data indicates that Example 2-B has increased dry and wet adhesion compared to Example 2-A, showing the utility of the invention.

Example 3

Example 3 evaluates the dry adhesion characteristics of premium exterior house paint using different levels of polyether amide. The aqueous paint composition is described below:

| Compound | Amount (grams) |
| --- | --- |
| Pigment Grind | |
| Water | 83 |
| Colloid 226/35 (Rhodia) | 7.1 |
| Nuosept 95 (Huls America) | 1.5 |
| AMP-95 (Angus Chemical) | 1.5 |
| Igepal CO-630 (Rhodia) | 3.5 |
| Tiona RCL-2 (SCM Chemicals) | 240.0 |
| Feldspar-Minspar 4 (Indusmin, Inc.) | 125.0 |
| Colloid 643 (Rhodia) | 1.8 |
| Micro Talc MP30-36 (Pfizer Pigments, Inc.) | 50.0 |
| Nopcocide N-40-D (Henkel) | 10.2 |
| Letdown | |
| Fultex PD-449 (H.B. Fuller Company) | 311.5 |
| Propylene glycol (Milsolv Corp.) | 30.3 |
| Texanol (Eastman Chemical) | 10.9 |
| Rheolate 278 (Rheox, Inc.) | 6.4 |
| Natrosol 250 MHBR (Aqualon Company) | 3.7 |
| Water | 256.0 |
| Colloid 643 (Rhodia) | 3.7 |

The premium exterior house paint described above was blended with various levels of NP-2068, which is a commercially available polyether amide from the H. B. Fuller Company (St. Paul, Minn.). The levels of polyether amide and the paints dry adhesion are described below: (Note: weight % of NP-2068 is based on the total solids of the wet paint).

| Weight % of NP-2068 | Dry Adhesion (grams) |
| --- | --- |
| Control (0%) | 1770 |
| 2.5% | 3340 |
| Control (0%) | 2010 |
| 5% | 5300 |
| Control (0%) | 2290 |
| 7.5% | 6200 |
| Control (0%) | 1690 |
| 10% | 6790 |

The paints show enhanced dry adhesion as the amount of polyether amide increases.

The above examples have been depicted solely for the purpose of exemplification and are not intended to restrict the scope or embodiments of the invention. The invention is further illustrated with reference to the claims that follow thereto.

What is claimed is:

1. An aqueous paint composition, useful as a protective coating and decorative coating, comprising:
    a) at least one aqueous polymer dispersion comprising the reaction product of at least one ethylenically-unsaturated monomer;
    b) at least one inorganic pigment;
    c) at least one polyether amide comprising the condensation product of;
        i) at least one polycarboxylic acid; and
        ii) at least one polyoxyalkylene amine; and
    d) optionally at least one water dispersible crosslinking agent selected from the group consisting of polyisocyanates, polyaziridines, melamine-formaldehyde resins, polyepoxies and polycarbodiimides.

2. The composition as described in claim 1, wherein said dispersion is formed from at least one ethylenically unsaturated monomer selected from the group consisting of acrylic, vinyl, allylic and acrylamide.

3. The composition as described in claim 1, wherein said dispersion further comprises at least one polyether amide comprising the condensation product of:
   a) at least one polycarboxylic acid; and
   b) at least one polyoxyalkylene amine.

4. The composition as described in claim 1, wherein said pigment is selected from the group consisting of titanium dioxide, talc, mica, silicates, zinc oxide clay, iron oxide, and mixtures thereof.

5. The composition as described in claim 1, wherein said polycarboxylic acid is adipic acid.

6. The composition as described in claim 1, wherein said amine is 4,7,10, trioxatridecane-1,13-diamine.

7. The composition as described in claim 1, wherein said amide is present in a range of from about 1.0% by weight to about 10.0% by weight, based on total solids.

8. The composition as described in claim 1, wherein said amide is amine-terminated.

9. The composition as described in claim 1, wherein said amide is acid-terminated.

10. The composition as described in claim 1, further comprising at least one water dispersible crosslinking agent selected from the group consisting of polyisocyanates, polyaziridines, melamine-formaldehyde resins, polyepoxies and polycarbodiimides.

11. A method for the preparation of aqueous paint compositions, useful as a protective coating and decorative coating, comprising the steps of:
   a) providing at least one aqueous-suspension comprising:
      i) at least one aqueous polymer dispersion comprising the reaction product of at least one ethylenically-unsaturated monomer;
      ii) at least one inorganic pigment; and
   b) providing at least one polyether amide comprising the condensation product of:
      i) at least one polyoxyalkylene diamine; and
      ii) at least one polycarboxylic acid; then combining a) and b) to form said composition.

12. The method as described in claim 11, wherein said dispersion is a polyacrylic dispersion.

13. The composition as described in claim 11, wherein said dispersion comprises the reaction product of:
   a) at least one ethylenically unsaturated monomer; and
   b) at least one polyether amide comprising the condensation product of:
      i) at least one polycarboxylic acid; and
      ii) at least one polyoxyalkylene amine;
   wherein said amide is used as a protective colloid.

14. The method as described in claim 11, wherein said pigment is selected from the group consisting of titanium dioxide, talc, mica, silicates, zinc oxide clay, iron oxide, and mixtures thereof.

15. The method as described in claim 11, wherein said diamine is 4,7,10, trioxatridecane 1,13-diamine.

16. The method as described in claim 11, wherein said acid is adipic acid.

17. The method as described in claim 11, wherein said amide is present in a range of from about 1.0% by weight to about 10% by weight, based on total solids.

18. The method as described in claim 11, wherein said composition has a viscosity of about 100 krebs.

19. A method for the preparation of a coated substrate, the method comprising the steps of:
   a) applying an aqueous paint composition on a substrate to form a wet-coated substrate, said composition comprising:
      i) at least one aqueous polymer dispersion comprising the reaction product of at least one ethylenically-unsaturated monomer;
      ii) at least one inorganic pigment; and
      iii) at least one polyether amide comprising the condensation product of:
         1) at least one polycarboxylic acid; and
         2) at least one polyoxyalkylene diamine; then
         2) at least one polyoxyalkylene diamine; then
   b) drying the wet-coated substrate.

20. The composition as described in claim 19, wherein the substrate is selected from the group consisting of asphalt, concrete, glass, wood, leather, metal, ceramics, cloth, natural rubber, and plastic.

* * * * *